(12) United States Patent
Kamitani et al.

(10) Patent No.: US 11,215,002 B2
(45) Date of Patent: Jan. 4, 2022

(54) SEALING STRUCTURE FOR SLIDING DOOR WITH TOUCH SENSOR

(71) Applicant: NISHIKAWA RUBBER CO., LTD., Hiroshima (JP)

(72) Inventors: Yoshihiko Kamitani, Hiroshima (JP); Masaru Koshimichi, Hiroshima (JP)

(73) Assignee: NISHIKAWA RUBBER CO., LTD., Hiroshima-Ken (JP)

( * ) Notice: Subject to any disclaimer, the term of this patent is extended or adjusted under 35 U.S.C. 154(b) by 46 days.

(21) Appl. No.: 16/821,606

(22) Filed: Mar. 17, 2020

(65) Prior Publication Data

US 2020/0300018 A1 Sep. 24, 2020

(30) Foreign Application Priority Data

Mar. 21, 2019 (JP) .............................. JP2019-053975

(51) Int. Cl.
*B60J 10/25* (2016.01)
*E05F 15/42* (2015.01)
*B60J 10/86* (2016.01)
*B60J 10/84* (2016.01)

(52) U.S. Cl.
CPC .............. *E05F 15/42* (2015.01); *B60J 10/25* (2016.02); *B60J 10/84* (2016.02); *B60J 10/86* (2016.02); *E05Y 2900/531* (2013.01)

(58) Field of Classification Search
CPC . E05F 15/42; E05F 15/44; E05F 15/46; B60J 10/25; B60J 10/86; B60J 10/84; B60J 5/12; E05Y 2900/531; E05Y 2400/54
See application file for complete search history.

(56) References Cited

U.S. PATENT DOCUMENTS

| 7,712,256 | B2* | 5/2010 | Kato ....................... E05F 15/46 49/26 |
| 8,491,033 | B2* | 7/2013 | Sakamaki ............. B60R 13/043 296/146.7 |
| 2002/0113602 | A1* | 8/2002 | Ishihara ................... B60J 10/00 324/658 |
| 2004/0163321 | A1* | 8/2004 | Yamaoka ................. B60J 10/25 49/479.1 |
| 2006/0191203 | A1* | 8/2006 | Ueda ........................ G01L 1/16 49/27 |

(Continued)

FOREIGN PATENT DOCUMENTS

JP 5083008 B2 9/2012

*Primary Examiner* — Justin B Rephann
(74) *Attorney, Agent, or Firm* — Holtz, Holtz & Volek PC

(57) ABSTRACT

A sealing structure includes a sliding door, a touch sensor, an inner seal, a drip seal, a buffer, and a projection. The inner seal couples to a door opening. The drip seal extends in a front and rear direction of an automobile body, is above the door opening, and is closer to an upper part of the automobile body than the inner seal. The drip seal and the inner seal make elastic contact with the sliding door. The buffer extends in an upper and lower direction of the automobile body and protrudes outwardly. The buffer is provided on a part of a body panel, which is closer to a front part of the automobile body than the door opening, and faces and is close to a flange when the sliding door is in a closed position. The projection extends from the touch sensor and makes elastic contact with the buffer.

12 Claims, 9 Drawing Sheets

(56) References Cited

U.S. PATENT DOCUMENTS

| | | | | |
|---|---|---|---|---|
| 2009/0289469 A1* | 11/2009 | Thiele | ..................... | E05F 15/42 |
| | | | | 296/146.1 |
| 2011/0047879 A1* | 3/2011 | Shimizu | .................. | E05F 15/44 |
| | | | | 49/358 |
| 2011/0241705 A1* | 10/2011 | Suhara | ................... | H01H 3/142 |
| | | | | 324/679 |
| 2012/0267914 A1* | 10/2012 | Thiele | ..................... | E05F 15/44 |
| | | | | 296/146.9 |
| 2014/0339842 A1* | 11/2014 | Kawaguchi | ............ | B60J 5/0495 |
| | | | | 296/1.04 |
| 2017/0021708 A1* | 1/2017 | Thiele | ..................... | B60J 10/25 |
| 2017/0072777 A1* | 3/2017 | Kawaguchi | ............. | B60J 10/18 |
| 2018/0348945 A1* | 12/2018 | Taguchi | .................. | E05F 15/42 |

\* cited by examiner

SEALING STRUCTURE FOR SLIDING DOOR WITH TOUCH SENSOR

CROSS REFERENCE TO RELATED APPLICATION

This application claims the benefit under 35 USC § 119 of JP Patent Application JP 2019-053975 filed Mar. 21, 2019, the entire disclosure of which is incorporated herein by reference.

BACKGROUND INFORMATION

The present invention relates to a sealing structure for a sliding door with a touch sensor. When objects including fingers are disposed between a door opening of an automobile body and the sliding door on a wagon, a station wagon or the like, a sensor of the touch sensor outputs a corresponding signal for detecting the objects.

A touch sensor 10 couples to a sliding door 1 on a wagon illustrated in FIGS. 7 and 8. The sliding door 1 moves between at least two positions to open and close the door opening of the automobile body. The touch sensor 10 extends in an upper and lower direction of the automobile body and protrudes toward a front part of the automobile body from a front end surface of the sliding door 1 (see, for example, FIGS. 1, 2, 6 of Japanese Patent No. 5083008).

An inner seal 20 couples along a whole circumference of the door opening of the automobile body to seal inside and outside of the automobile body by making elastic contact with an inner-cabin side of the sliding door 1 of the automobile when the sliding door 1 is in a closed position. A drip seal 30 extends in a front and rear direction of the automobile body and is above the door opening. The drip seal 30, together with the inner seal 20, seals the inside and outside of the automobile body by making elastic contact with the inner-cabin side of the sliding door 1 of the automobile when the sliding door 1 is in the closed position. The drip seal 30 is closer to the upper part of the automobile body than the inner seal 20.

As illustrated in FIG. 9, the touch sensor 10 includes an installation base member 11, a hollow part 12, an oblique wall 14, and a seal lip 15. The installation base member 11 couples to a flange F, and has a substantially U-shaped cross section including an inner-cabin side wall 11a, an outer-cabin side wall 11b, and a connecting wall 11c. The hollow part 12 is integrally molded with the connecting wall 11c of the installation base member 11. The oblique wall 14 extends toward an exterior of the automobile and slopes rearward from a rear end of the outer-cabin side wall 11b. The seal lip 15 extends inwardly toward an interior of the automobile and slopes frontward from a rear end of the oblique wall 14. The seal lip 15 faces and makes elastic contact with an inner-cabin side surface of a front door 2 when the sliding door 1 is in a closed position. The flange F is formed on a front edge of the sliding door 1. A sensor (pressure sensitive sensor) S is fixed in the hollow part 12 and outputs a corresponding electric signal upon detecting the objects such as a part of human bodies (fingers, hands or legs) between the sliding door 1 and the door opening of the automobile body.

The installation base member 11 has a plurality of anchoring lips 16 and anchoring parts 17 formed on an inner side and a core 18 embedded in the installation base member 11. The anchoring lips 16 and anchoring parts 17 extend toward the inner side and hold the flange F by making elastic contact. The core 18 has a substantially U-shaped cross section and increases rigidity of the installation base member 11.

With this configuration, water W from above collects on the drip seal 30 as illustrated in FIG. 8 and FIG. 9. Water W is then drained toward the front of the automobile body, drips, passes through a space between the touch sensor 10 and the inner-cabin side surface of the front door 2, and reaches the inner seal 20. Especially, the seal lip 15 of the touch sensor 10, which makes elastic contact with the inner-cabin side surface of the front door 2, does not seal a gap between a rear door 1 and the front door 2 completely, and allows water W to reach the inner seal 20.

More specifically, the flange F, formed on the front end of the sliding door 1, has a substantially linear shape except for an upper end of the sliding door 1. The touch sensor 10 couples to the part having the substantially linear shape of the flange F, not on the upper end of the sliding door 1. In other words, an upper end of the space sealed by the seal lip 15 of the touch sensor 10 is lower than the upper end of the slide door 1.

Also, snow and noise may enter a space between the sliding door 1 and the body panel 5.

With this configuration, the inner seal 20 alone does not prevent entrance of water W, snow or noise completely owing to deviation in assembly.

Therefore, an object of the present invention is to provide the sealing structure improved in sealing function for the sliding door with the touch sensor.

SUMMARY

In order to achieve the above-mentioned object, according to one aspect of the invention, a sealing structure for a sliding door with a touch sensor is provided. The sealing structure includes a sliding door (1), a flange (F), a touch sensor (10), an inner seal (20), a drip seal (30), a buffer (100), and a projection (200).

The sliding door (1) moves between at least two positions to open and close a door opening of an automobile body.

The flange (F) protrudes from a front edge of the sliding door (1).

The touch sensor (10) couples to the flange (F). The touch sensor (10) extends in an upper and lower direction of the automobile body. The touch sensor (10) detects an object disposed between the sliding door (1) and the door opening of the automobile body.

The inner seal (20) couples to the door opening of the automobile body.

The drip seal (30) extends in a front and rear direction of the automobile body. The drip seal (30) is above the door opening. The drip seal (30) is closer to an upper part of the automobile body than the inner seal (20). The drip seal (30) as well as the inner seal (20) make elastic contact with the sliding door (1).

The buffer (100) extends in the upper and lower direction of the automobile body and protrudes outwardly toward an exterior of the automobile. The buffer (100) is provided on a part of a body panel (5), the part of the body panel (5) is closer to a front part of the automobile body than the door opening, and the part of the body panel (5) faces and is close to the flange (F) when the sliding door (1) is in a closed position.

The projection (200) extends from the touch sensor (10) and makes elastic contact with the buffer (100).

In addition, according to an aspect of the present invention, the buffer (100) is a hollow seal part (100) and the projection (200) is a lip (200) having a substantially tongue-shaped cross section.

In addition, according to an aspect of the present invention, the flange (F) protrudes frontward from the front edge of the sliding door (1).

The touch sensor (10) includes an installation base member (11), a hollow part (12), and a sensor (S).

The installation base member (11) has a substantially U-shaped cross section including an inner-cabin side wall (11a), an outer-cabin side wall (11b), and a connecting wall (11c). The connecting wall (11c) connects the side walls (11a, 11b). The installation base member (11) has a plurality of anchoring parts (16, 17) formed on an inner side. The anchoring parts (16, 17) extend toward the inner side.

The hollow part (12) is unified with the connecting wall (11c). The hollow part (12) makes elastic contact with the object.

The sensor (S) is fixed in the hollow part (12). When the object makes contact with the hollow part (12), the sensor (S) outputs corresponding electric signal.

The lip (200) extends inwardly from an end of the inner-cabin side wall (11a) of the installation base member (11) toward an interior of the automobile.

In addition, according to an aspect of the present invention, a front end of the drip seal (30) extends downward. An upper end part (P2) of a seal line (200L) is closer to a rear part of the automobile body than a front end part (P1) of a lower end line (30L). The seal line (200L) is a part of the projection (200) in elastic contact with the buffer (100). The lower end line (30L) is a part of the drain (V) of the drip seal (30) in elastic contact with the sliding door (1).

In addition, according to an aspect of the present invention, the upper end part (P2) of the seal line (200L) is closer to the upper part of the automobile body than the front end part (P1) of the lower end line (30L). The seal line (200L) is the part of the projection (200) in elastic contact with the buffer (100). The lower end line (30L) is the part of the drain (V) of the drip seal (30) in elastic contact with the sliding door (1).

In addition, according to an aspect of the present invention, the front end of the drip seal (30) extends downward, and the front end of the drip seal (30) is integrally molded with the buffer (100).

Symbols in parentheses show constituents or items corresponding to the drawings.

According to the present invention, the sealing structure includes the sliding door, the touch sensor, the inner seal, the drip seal, the buffer, and the projection. The touch sensor couples the sliding door. The inner seal and the drip seal make elastic contact with the sliding door. The buffer extends in the upper and lower direction of the automobile body and protrudes outwardly toward the exterior of the automobile. The buffer is provided on the part of the body panel, the part of the body panel is closer to the front part of the automobile body than the door opening, and the part of the body panel faces and is close to the flange when the sliding door is in the closed position. The flange protrudes from the front edge of the sliding door. The projection extends from the touch sensor and makes elastic contact with the buffer. With this configuration, in case water drips from the drip seal and infiltrates into the interior of the automobile, a part of the projection in elastic contact with the buffer dams up water, and prevents water from reaching the inner seal.

In other words, the inner seal as well as the part of the projection in elastic contact with the buffer doubly seal a front part of the sliding door (closer to the front part of the automobile body). The sliding door is improved in sealing function, waterproof function and soundproof function, and prevents infiltration of snow. While the inner seal alone does not always prevent infiltration of water completely due to shift in fitting, the projection in elastic contact with the buffer, prior to the inner seal, prevents water from reaching the inner seal.

In addition, as the projection makes elastic contact with the buffer, the inner seal is decreased in elastic contact force, and deterioration in door closability is prevented.

In addition, the lip which has the substantially tongue-shaped cross section makes elastic contact with the buffer which is the hollow seal part. With this configuration, the lip touches the seal part softly and weakly, and reaction force relative to load slightly affects the touch sensor. The load generates when the lip makes elastic contact with the seal part.

With this configuration, the touch sensor, required to be precise in sensing, is kept away from vibration, and malfunction of the touch sensor is prevented.

In addition, the installation base member of the touch sensor has the substantially U-shaped cross section, and the lip extends inwardly from the end of the inner-cabin side wall of the installation base member toward the interior of the automobile. Since the end of the inner-cabin side wall is distant from the hollow part with the sensor fixed inside, the reaction force relative to the load, which generates when the lip makes elastic contact with the seal part, does not affect the hollow part, and malfunction of the touch sensor is prevented.

Also, with this configuration, tear and noise, caused by the lip in contact with the hollow part, is prevented.

In addition, the upper end part of the seal line is closer to the rear part of the automobile body than the front end part of the lower end line. The seal line is the part of the projection in elastic contact with the buffer. The lower end line is the part of the drain of the drip seal in elastic contact with the sliding door. Accordingly, water which flows along the drain of the drip seal drips on a position closer to the front part of the automobile body than the seal line of the projection relative to the buffer.

With this configuration, water which flows along the drain of the drip seal and drips is prevented from approaching the inner seal.

In addition, the upper end part of the seal line is closer to the upper part of the automobile body than the front end part of the lower end line. The seal line is the part of the projection in elastic contact with the buffer. The lower end line is the part of the drain of the drip seal in elastic contact with the sliding door.

With this configuration also, water which flows along the drain of the drip seal and drips is prevented from approaching the inner seal.

In addition, the front end of the drip seal extends downward, and the front end of the drip seal is integrally molded with the buffer. With this configuration, water which flows along the drain of the drip seal and drips is prevented from approaching the inner seal. Especially, with the configuration that the buffer is the hollow seal part, water flows inside the hollow seal part and is drained outwardly toward the exterior of the automobile.

DETAILED DESCRIPTION

Figure 1:
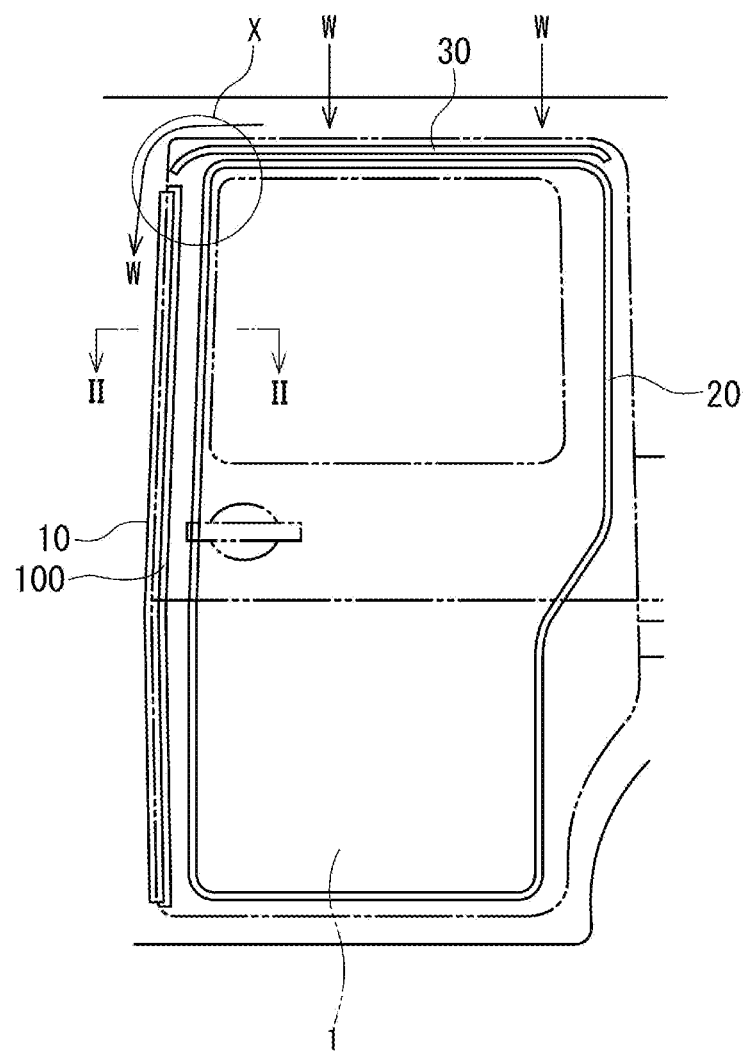
FIG. 1 is an enlarged side view of a sliding door of a sealing structure according to an embodiment of the invention of the sliding door with a touch sensor.

Referring to the Drawings, a sealing structure according to an embodiment of the present invention for a sliding door with a touch sensor will be described.

As illustrated in FIG. 1 to FIG. 4, the sealing structure according to the embodiment of the present invention for the sliding door with the touch sensor includes a sliding door 1, a touch sensor 10, an inner seal 20, a drip seal 30, a buffer 100, and a projection 200. The sliding door 1 moves between at least two positions to open and close a door opening of an automobile body. The touch sensor 10 couples to a front edge of the sliding door 1. The touch sensor 10 detects an object disposed between the sliding door 1 and the door opening of the automobile body. The inner seal 20 couples along a whole circumference of the door opening of the automobile body. The drip seal 30 is closer to the upper part of the automobile body than the inner seal 20. The drip seal 30 and the inner seal 20 make elastic contact with the sliding door 1.

Figure 2:
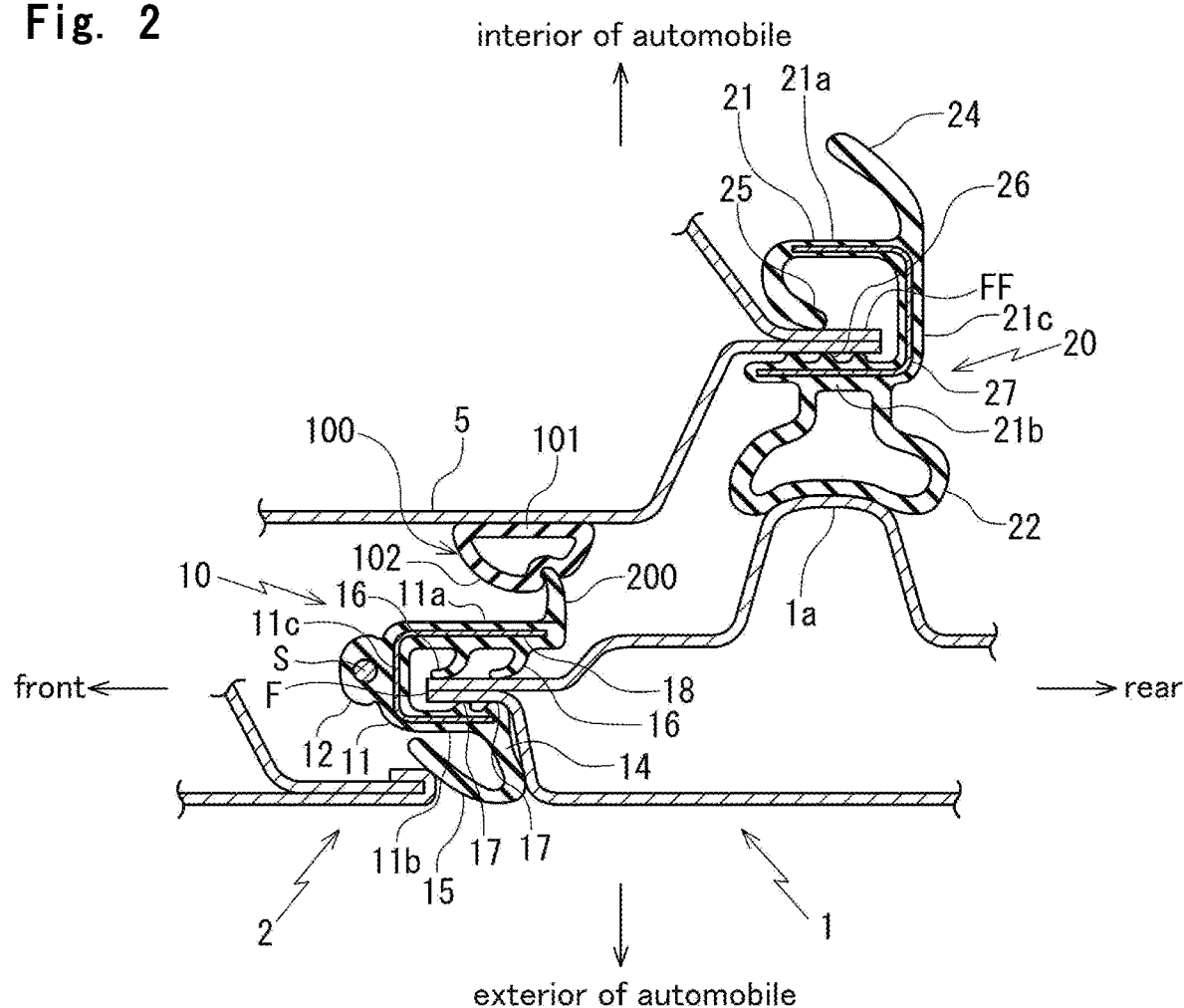
FIG. 2 is an enlarged cross-sectional view of the sealing structure according to the embodiment of the invention of the sliding door with the touch sensor taken along line II-II of FIG. 1.

As illustrated in FIG. 2, the touch sensor 10 extends in an upper and lower direction of the automobile body. The touch sensor 10 couples to a flange F and protrudes toward a front part of the automobile body from the flange F. The flange F protrudes from a front edge of the sliding door. It is to be noted that words "a front and a rear" indicate a front and rear direction of the automobile body. In the embodiment, a part closer to a hollow part 12 of the touch sensor 10 is a front part of the automobile body, and a part closer to an installation base member 11 is a rear part of the automobile body.

The touch sensor 10 is formed by extrusion molding. The touch sensor 10 includes an installation base member 11, a hollow part 12, an oblique wall 14, and a seal lip 15. The installation base member 11 directly couples to the flange F, and has a substantially U-shaped cross section including an inner-cabin side wall 11a, an outer-cabin side wall 11b, and a connecting wall 11c. The connecting wall 11c connects the side walls 11a, 11b. The hollow part 12 is integrally molded with the connecting wall 11c of the installation base member 11. The oblique wall 14 extends outwardly toward an exterior of the automobile and slopes rearward from a rear end of the outer-cabin side wall 11b. The seal lip 15 extends toward an interior of the automobile and slopes frontward from a rear end of the oblique wall 14. The seal lip 15 faces and makes elastic contact with a rear end of a front door 2 when the sliding door 1 is in a closed position. The installation base member 11 has a plurality of anchoring lips 16 and anchoring parts 17 formed on an inner side and a core 18 embedded in the installation base member 11. The anchoring lips 16 and the anchoring parts 17 extend toward the inner side and hold the flange F by making elastic contact. The core 18 has a substantially U-shaped cross section and increases rigidity of the installation base member 11.

A sensor (pressure sensitive sensor) S is fixed in the hollow part 12 and outputs a corresponding electric signal upon detecting the objects such as a part of human bodies (fingers, hands or legs) between the sliding door 1 and the door opening of the automobile body. The hollow part 12 makes elastic contact with the object disposed between the sliding door 1 and the rear end of the front door 2 when the sliding door 1 is moved towards a closed position. The sensor S in the hollow part 12 outputs a corresponding electric signal upon detecting the object between the sliding door 1 and the rear end of the front door 2.

The sensor S has two core wires (electrode wires) embedded in two rubber like elastic bodies (conductive parts) which have conductivity. In addition, the rubber like elastic bodies have a space between the rubber like elastic bodies. The two core wires extend in the upper and lower direction (longitudinal direction) and are fixed in the hollow part 12. As the object is disposed between the sliding door 1 and the rear end of the front door 2 when the sliding door 1 is moved towards the closed position, the object makes contact with a part of the hollow part 12, and then the two rubber like elastic bodies contact with each other and the two core wires short. Resultant change in electric signal is transmitted to a control unit joined with leads which are connected with the two core wires in a lower side terminal part of the touch sensor 10, and as a result, the object is detected.

A configuration of the sensor S is not limited as long as the sensor S is fixed in the hollow part 12 and detects the objects.

As illustrated in FIG. 1 and FIG. 2, the inner seal 20 couples to a flange FF. The flange FF is formed along a circumferential edge of a door opening of an automobile body. The inner seal 20 includes an installation base member 21, a hollow seal part 22, and a decorative lip 24. The installation base member 21 has a substantially U-shaped cross section including an inner-cabin side wall 21a, an outer-cabin side wall 21b, and a connecting wall 21c. The connecting wall 21c connects the side walls 21a, 21b. The hollow seal part 22 is integrally molded with the outer-cabin side wall 21b of the installation base member 21 and protrudes outwardly toward the exterior of the automobile. The decorative lip 24 extends inwardly toward an interior of the automobile from a position of connection between the inner-cabin side wall 21a and the a connecting wall 21c. The installation base member 21 has an anchoring lip 25 and a plurality of anchoring parts 26 formed on an inner side and a core 27 embedded in the installation base member 21. The anchoring lip 25 and the anchoring parts 26 extend toward the inner side and hold the flange FF by making elastic contact. The core 27 has a substantially U-shaped cross section and increases rigidity of the installation base member 21.

The hollow seal part 22 of the inner seal 20 seals an inside and outside of the automobile body by making elastic contact with a convex-shaped part 1a of the sliding door 1 when the sliding door 1 is in the closed position. The convex-shaped part 1a protrudes inwardly from an inner-cabin side of the sliding door 1 toward the interior of the automobile.

Figure 4:
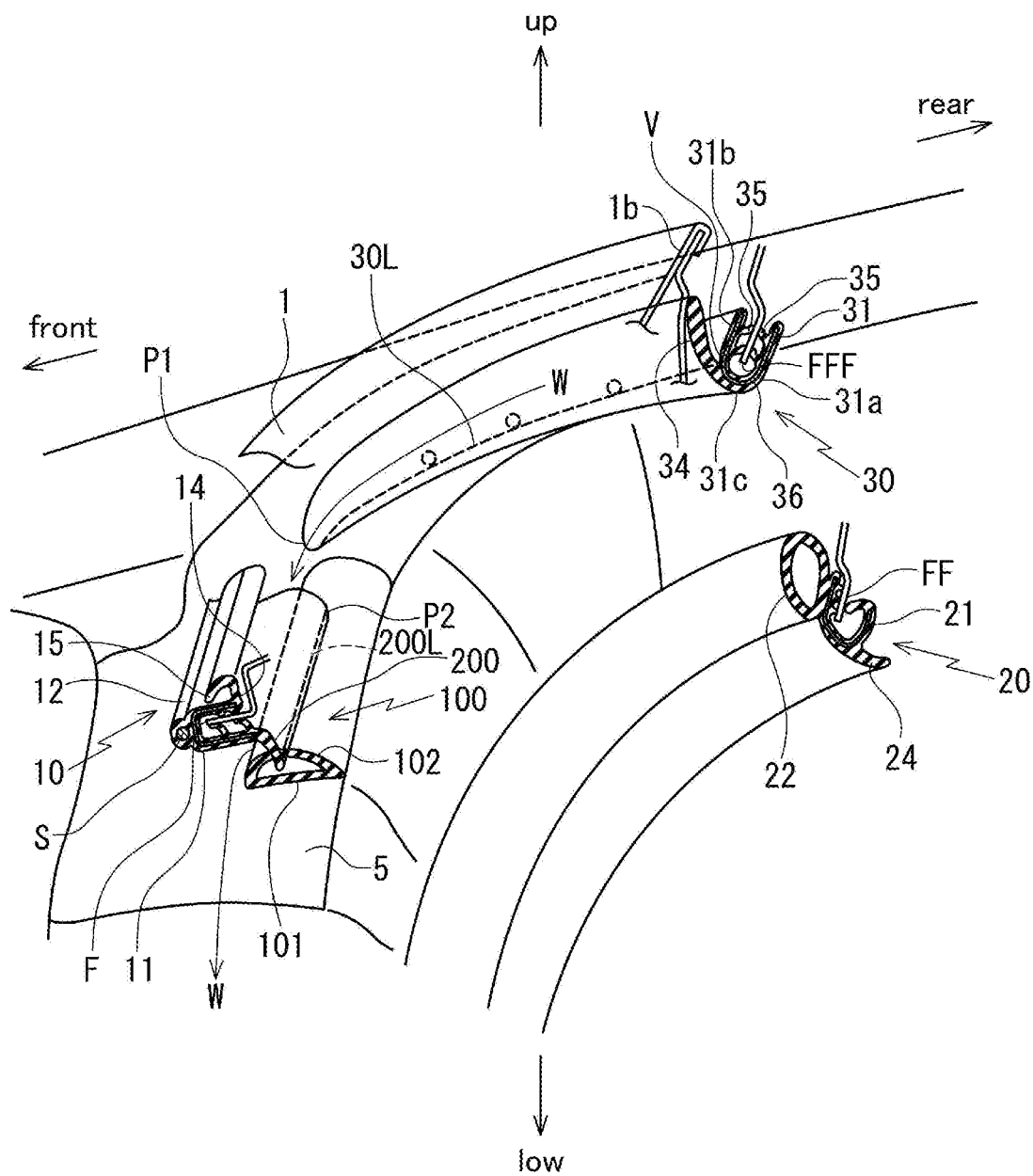
FIG. 4 is an enlarged perspective view of a part X of FIG. 1 as an important part of the sealing structure according to the embodiment of the invention of the sliding door with the touch sensor.

As illustrated in FIG. 1 and FIG. 4, the drip seal 30 extends in a front and rear direction of the automobile body and is above the door opening of the automobile body. The drip seal 30 couples to a flange FFF. The flange FFF is closer to the upper part of the automobile body than the flange FF, formed along the circumferential edge of the door opening of the automobile body. The drip seal 30 includes an installation base member 31 and a seal lip 34. The installation base member 31 has a substantially U-shaped cross section including an inner-cabin side wall 31a, an outer-cabin side wall 31b, and a connecting wall 31c. The connecting wall 31c connects the side walls 31a, 31b. The installation base member 31 has a plurality of anchoring parts 35 formed on an inner side and a core 36 embedded in the installation base member 31. The anchoring parts 35 extend toward the inner side and hold the flange FFF by making elastic contact. The core 36 has a substantially U-shaped cross section and increases rigidity of the installation base member 31. The seal lip 34 extends outwardly toward the exterior of the automobile from a position of connection between the outer-cabin side wall 31b and the connecting wall 31c.

The seal lip 34 of the drip seal 30, together with the inner seal 20, seals the inside and outside of the automobile body by making elastic contact with an upper periphery 1b of the sliding door 1 when the sliding door 1 is in the closed position. The upper periphery 1b protrudes inwardly from the inner-cabin side of the sliding door 1 toward the interior of the automobile. The upper periphery 1b is closer to the upper part of the automobile body than the convex-shaped part 1a.

Figure 3:
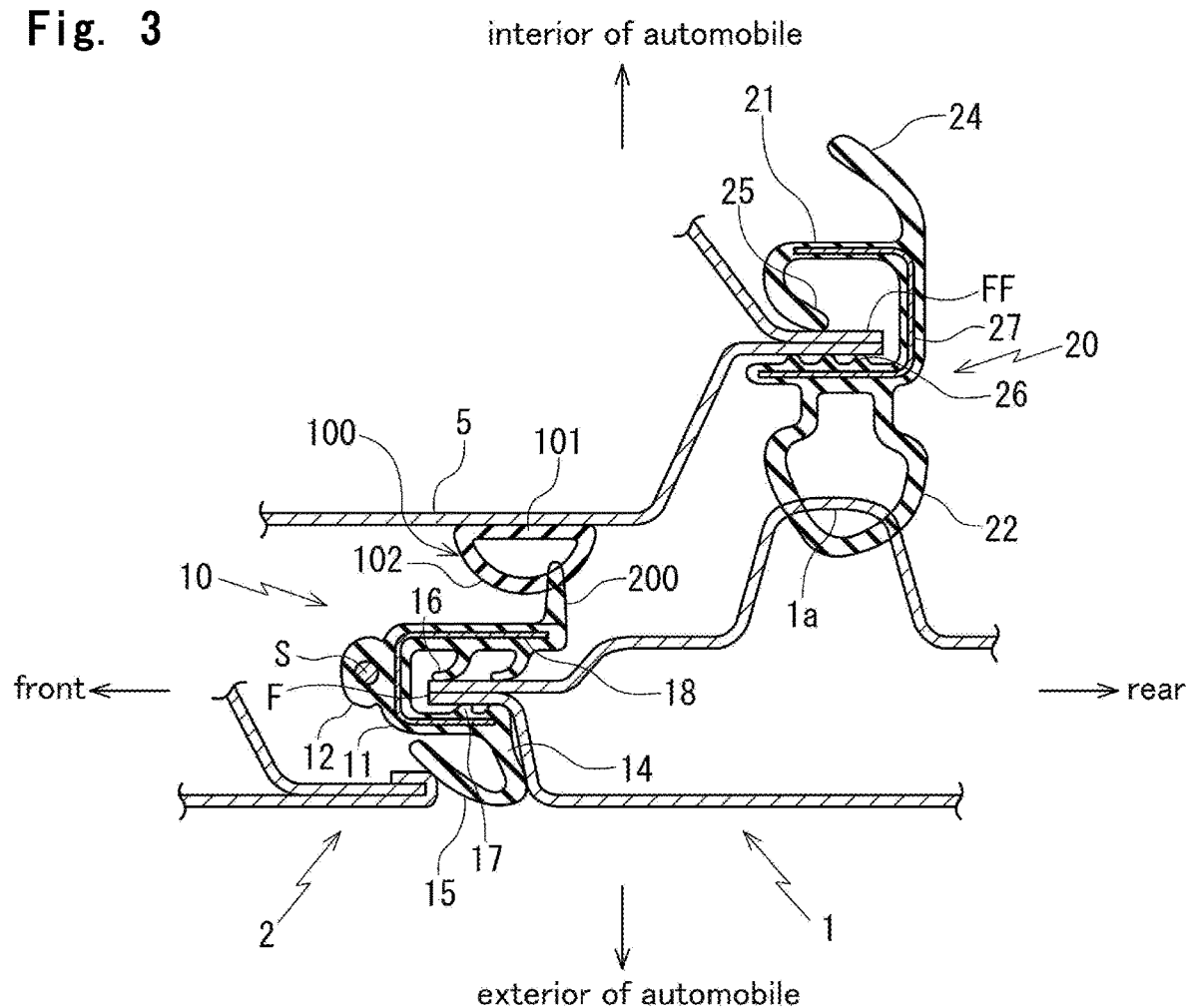
FIG. 3 is the enlarged cross-sectional view of the sealing structure according to the embodiment of the invention of the sliding door with the touch sensor taken along line II-II of FIG. 1 with the sliding door spaced from an automobile body.

While in this embodiment a base root of the seal lip 34 is on the position of connection between the outer-cabin side wall 31b and the connecting wall 31c, this should not be construed in a limiting sense. Another possible embodiment is that the base root of the seal lip 34 is on the outer-cabin side wall 31b (illustration omitted) or on the connecting wall 31c as illustrated in FIG. 3 of Japanese Patent No. 5083008.

While in this embodiment the seal lip 34 has a substantially tongue-shaped cross section, this should not be construed in a limiting sense. Another possible embodiment is that the seal lip 34 is hollow.

A front end of the drip seal 30 is curved and gradually extends in a downward direction. Water W from above collects on the drip seal 30 (more specifically, a drain V between the seal lip 34 and the outer-cabin side wall 31b) and drips from the front end of the drip seal 30.

A buffer 100 extends in the upper and lower direction of the automobile body and protrudes outwardly toward the exterior of the automobile. As illustrated in FIG. 1 and FIG. 4, the buffer 100 is provided on a part of a body panel 5, the part of the body panel 5 is closer to a front part of the automobile body than the door opening, and the part of the body panel 5 faces and is close to the flange F (in other words, inner-cabin side wall 11a of the touch sensor 10) when the sliding door 1 is in the closed position. A projection 200 extends from the touch sensor 10 and makes elastic contact with the buffer 100.

The buffer 100 is a hollow seal part 100. The hollow seal part 100 includes a plate-like installation member 101 and a hollow part 102. The plate-like installation member 101 is fixed on the body panel 5 by a double sided tape (or fixing members including adhesive and clips). The hollow part 102 has a substantially semi-circular shaped cross section and extends outwardly toward the exterior of the automobile from the plate-like installation member 101.

The projection 200 is a lip 200. The lip 200 has a substantially tongue-shaped cross section. The lip 200 extends inwardly from an end of the inner-cabin side wall 11a of the installation base member 11 toward an interior of the automobile. In the present embodiment, the lip 200 protrudes inwardly from a top end of the inner-cabin side wall 11a.

A length of the lip 200 is sized to touch only the hollow part 102 when the sliding door 1 is in the closed position as illustrated in FIG. 2, and to be spaced from the body panel 5 or the hollow part 12 of the touch sensor 10 even in case the lip 200 is bent by a large area.

Examples of material for use as the hollow seal part 100 and the lip 200, which makes elastic contact with the hollow seal part 100, include EPDM of synthetic rubber and TPO and TPS of thermoplastic elastomer, but are not specifically limited. It is preferable that the lip 200 touches the seal part 100 softly and weakly such that a reaction force relative to a load, which generates when the lip 200 makes elastic contact with the hollow seal part 100, slightly affects the hollow part 12 of the touch sensor 10.

With this configuration, the touch sensor 10, required to be precise in sensing, is kept away from vibration, and malfunction of the touch sensor 10 is prevented.

The sealing structure according to the embodiment of the invention of the sliding door with the touch sensor includes the hollow seal part (buffer) 100 and the lip (projection) 200. The hollow seal part 100 extends in the upper and lower direction of the automobile body and protrudes outwardly toward the exterior of the automobile. The hollow seal part 100 is provided on the part of the body panel closer to the front part of the automobile body than the door opening. The lip 200 extends from the touch sensor 10 and makes elastic contact with the hollow seal part 100. With this configuration, as illustrated in FIG. 1 and FIG. 4, in case water W drips from the drip seal 30 and infiltrates into the interior of the automobile, a part of the lip 200 in elastic contact with the hollow seal part 100 dams up water W, and prevents water W from reaching the inner seal 20.

In other words, the inner seal 20 as well as the lip 200 in elastic contact with the hollow seal part 100 doubly seal a front part of the sliding door 1 (closer to the front part of the automobile body). The sliding door 1 is improved in sealing function, waterproof function and soundproof function, and prevents direct infiltration of snow. While the inner seal 20 alone does not always prevent infiltration of water completely due to shift in fitting, the lip 200 in elastic contact with the hollow seal part 100, prior to the inner seal 20, prevents water W from reaching the inner seal 20.

In addition, as the lip 200 makes elastic contact with the hollow seal part 100, the inner seal 20 is decreased in elastic contact force, and deterioration in door closability is prevented.

In this embodiment the buffer 100 is the hollow seal part 100 and the projection 200 is the lip 200. But, this should not be construed in a limiting sense as long as the projection 200 makes elastic contact with the buffer 100 softly, reaction force (load) does not affect the hollow part 12 of the touch sensor 10 with the sensor S fixed, and the buffer 100 and the projection 200 are improved in sealing function. The sensor S is required to be precise. Another possible embodiment is that the buffer 100 has a shape of a plate or a lump and the projection 200 has a convex shaped part which makes elastic contact with the buffer 100, under a condition that the buffer 100 and the projection 200 are formed of materials improved in buffering property.

Figure 5:
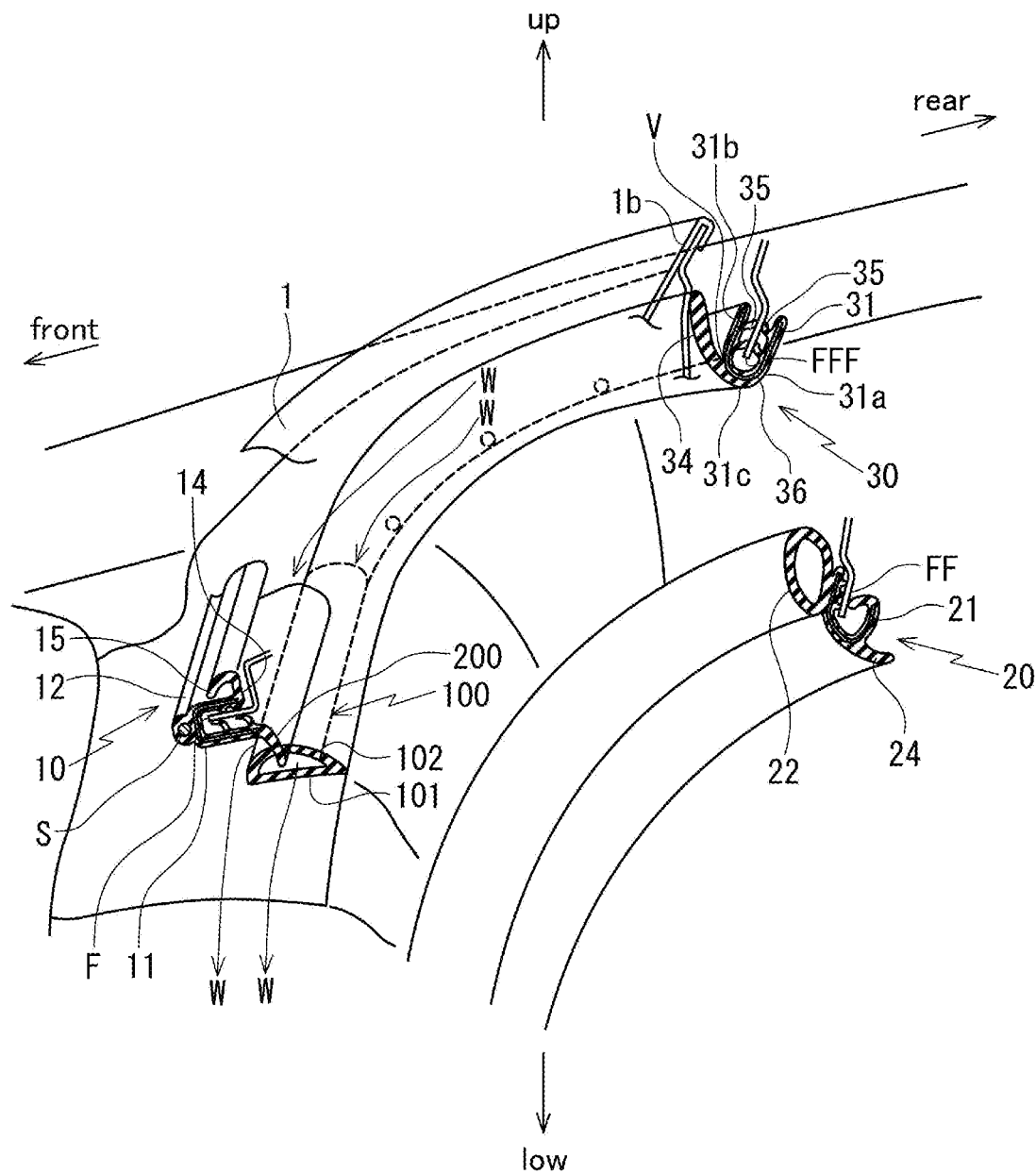
FIG. 5 is the enlarged perspective view of the part X of FIG. 1 as the important part of the sealing structure according to another embodiment of the invention of the sliding door with the touch sensor.

Another possible embodiment is that, as illustrated in FIG. 5, the hollow seal part 100 is integrally molded with the front end of the drip seal 30 by die molding such that the hollow seal part 100 is continuous and integral with the front end of the drip seal 30.

More specifically, a front end of the seal lip 34 of the drip seal 30 connects with the hollow part 102 of the hollow seal part 100, and a front end of the outer-cabin side wall 31b of the drip seal 30 connects with the plate-like installation member 101 of the hollow seal part 100.

With this configuration, since there is not a gap between the drip seal 30 and the hollow seal part 100, water W, which flows along the drain V of the drip seal 30 and drips, is prevented from approaching the inner seal 20. Also, water W flows inside the hollow seal part 100 and is drained outwardly toward the exterior of the automobile.

Figure 6:
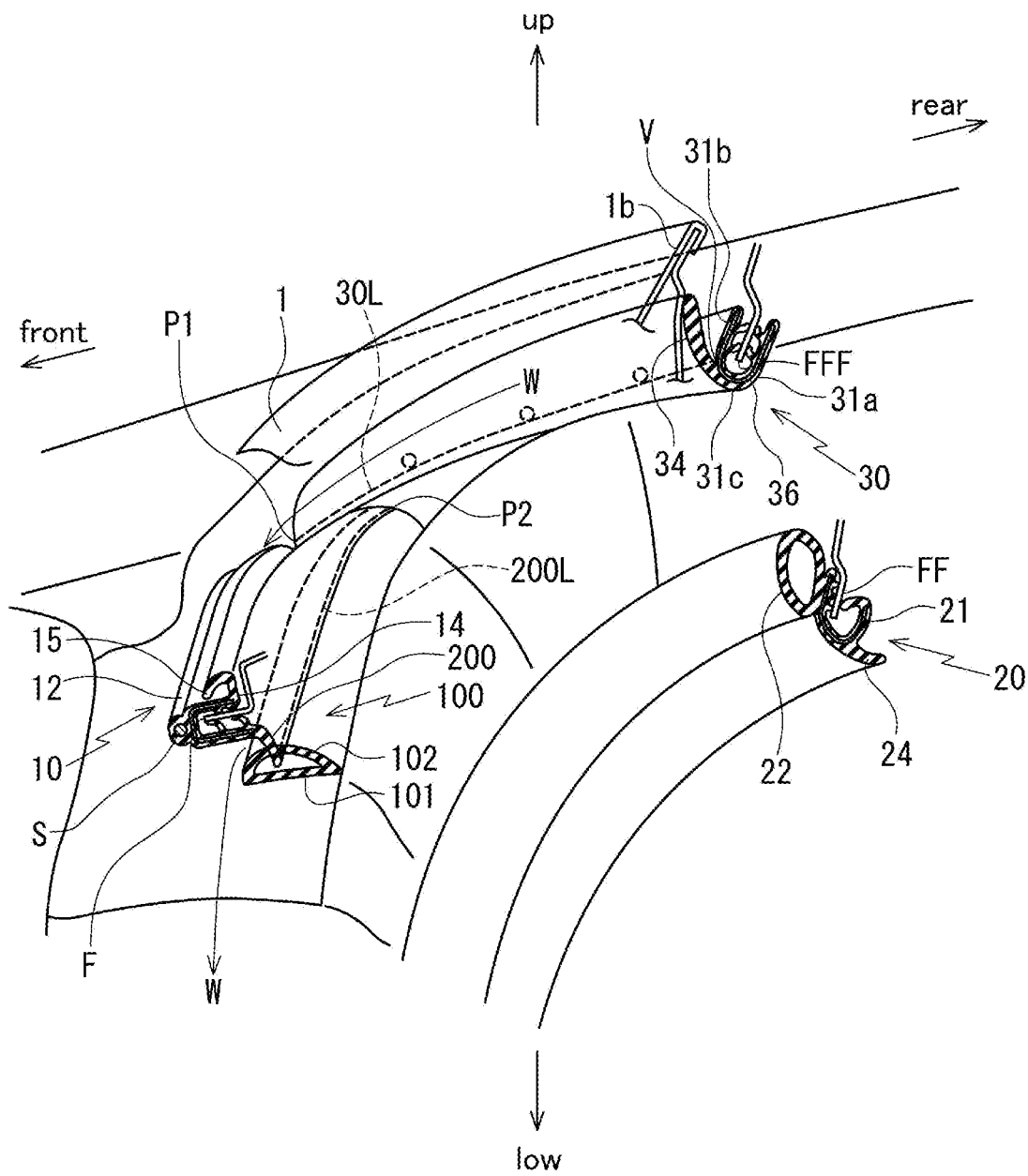
FIG. 6 is the enlarged perspective view of the part X of FIG. 1 as the important part of the sealing structure according to still another embodiment of the invention of the sliding door with the touch sensor.
Figure 7:
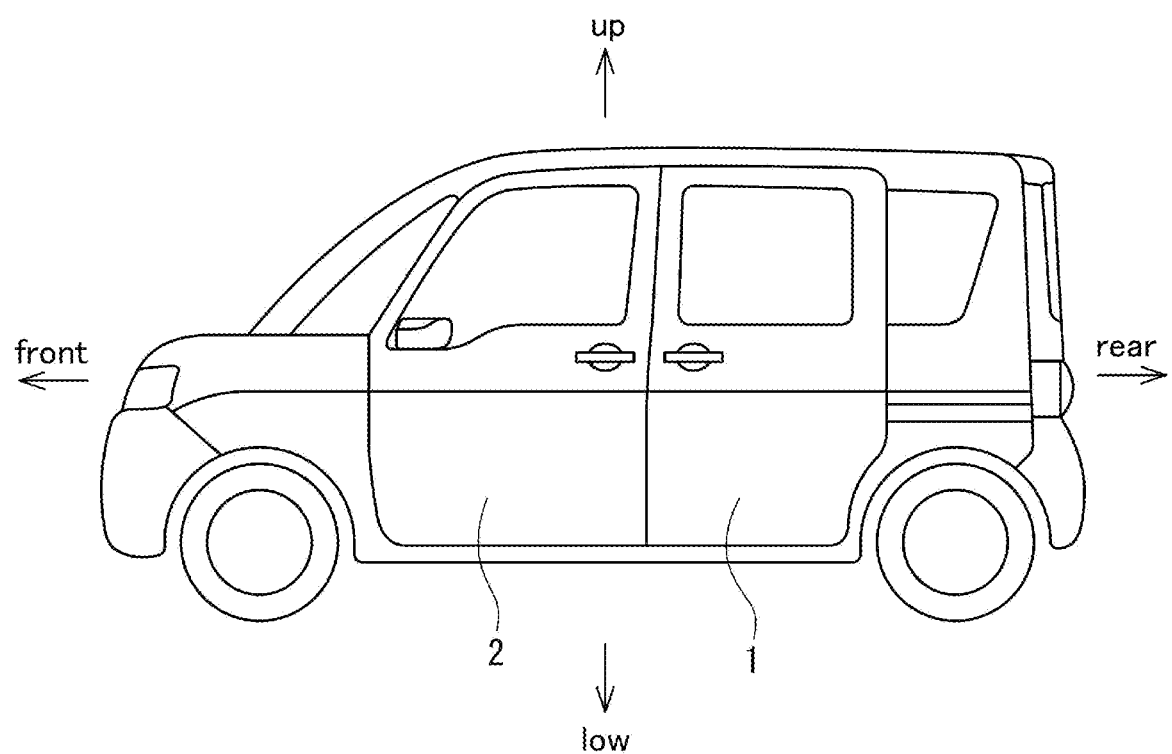
FIG. 7 is a side view of an automobile of which sliding door moves to open and close a door opening.
Figure 8:
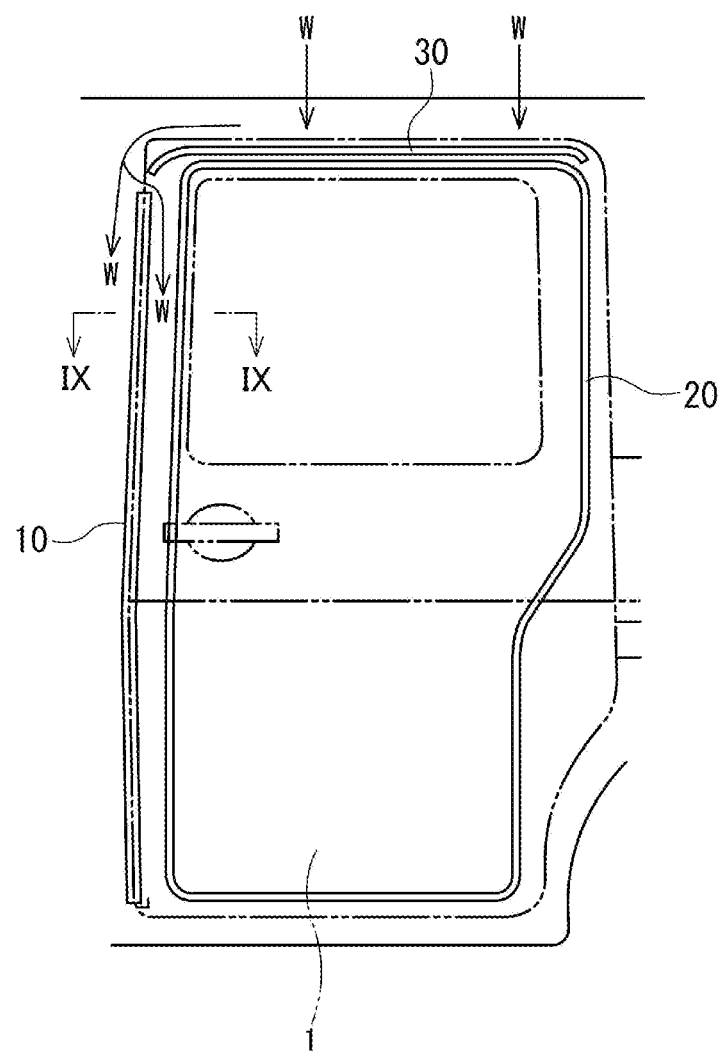
FIG. 8 is an enlarged side view of a sliding door of a sealing structure according to a prior art of the sliding door with a touch sensor.
Figure 9:
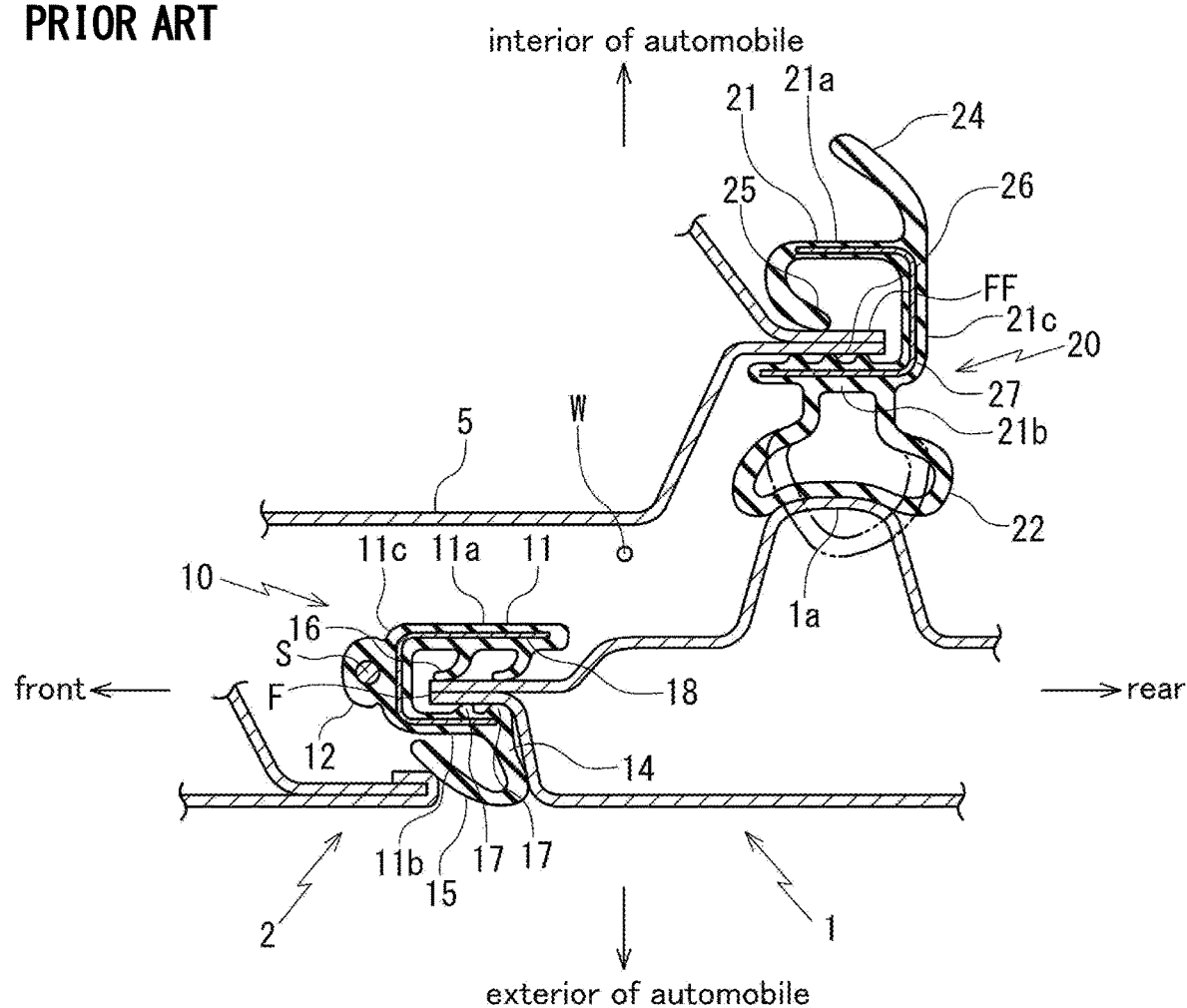
FIG. 9 is an enlarged cross-sectional view of the sealing structure according to the prior art of the sliding door with the touch sensor taken along line IX-IX of FIG. 8.

Another possible embodiment is that, as illustrated in FIG. 6, the drip seal 30 and the hollow seal part 100 are separate from each other such that a position of the drip seal 30 in relation to the hollow seal part 100 is transformed to improve the sealing performance.

More specifically, an upper end part P2 of a seal line 200L is closer to a rear part of the automobile body than a front end part P1 of a lower end line 30L. Also, the upper end part P2 of the seal line 200L is closer to the upper part of the automobile body than the front end part P1 of the lower end line 30L. The seal line 200L is a part of the lip 200 in elastic contact with the hollow seal part 100. The lower end line 30L is a part of the drain V of the drip seal 30 in elastic contact with the sliding door 1.

With this configuration, water W, which flows along the drain V of the drip seal 30, drips on a position closer to the front part of the automobile body than the seal line 200L. As a result, water W is prevented from approaching the inner seal 20.

Even in case the upper end part P2 of the seal line 200L of the lip 200 relative to the hollow seal part 100 is closer to the lower part of the automobile body than the front end part P1 of the lower end line 30L of the drain V of the drip seal 30, water W is prevented from approaching the inner seal 20. This is secured by a configuration that the upper end part P2 of the seal line 200L is closer to the rear part of the automobile body than the front end part P1 of the lower end line 30L.

While in the present embodiment, the touch sensor 10 detects the object such as the part of human bodies (fingers, hands or legs) between the sliding door 1 and the rear end of the front door 2 as the opening of the automobile body, this should not be construed in a limiting sense. Another possible embodiment is that the touch sensor 10 detects the object between the sliding door 1 and the circumferential edge of the body panel 5 as the door opening of the automobile body, not the front door 2.

We claim:

1. A sealing structure for a sliding door with a touch sensor, the sealing structure comprising:
   the sliding door, the sliding door being movable between at least two positions to open and close a door opening of an automobile body;
   a flange which protrudes from a front edge of the sliding door;
   the touch sensor, the touch sensor being configured to operably couple to the flange, the touch sensor extending in an upper and lower direction of the automobile body, and the touch sensor being configured to detect an object disposed between the sliding door and the door opening of the automobile body;
   an inner seal which is configured to couple to the door opening of the automobile body;
   a drip seal which extends in a front and rear direction of the automobile body, the drip seal being above the door opening, the drip seal being closer to an upper part of the automobile body than the inner seal, and the drip seal and the inner seal being configured to make elastic contact with the sliding door;
   a buffer which extends in the upper and lower direction of the automobile body, the buffer protruding outwardly toward an exterior of the automobile, the buffer being provided on a part of a body panel, the part of the body panel being closer to a front part of the automobile body than the door opening, and the part of the body panel facing and being close to the flange when the sliding door is in a closed position; and
   a projection which extends from the touch sensor, the projection being configured to make elastic contact with the buffer.

2. The sealing structure as claimed in claim 1, wherein the buffer comprises a hollow seal part and the projection comprises a lip having a substantially tongue-shaped cross section.

3. The sealing structure as claimed in claim 2, wherein the flange protrudes frontward from the front edge of the sliding door, and
   wherein the touch sensor includes:
      an installation base member which has a substantially U-shaped cross section including an inner-cabin side wall, an outer-cabin side wall, and a connecting wall, the connecting wall connecting the side walls, the installation base member having a plurality of anchoring parts formed on an inner side thereof, and the anchoring parts extending toward the inner side;
      a hollow part unified with the connecting wall, the hollow part being configured to make elastic contact with the object;
      a sensor fixed in the hollow part, the sensor being configured to output a corresponding electric signal when the object makes contact with the hollow part; and
      the lip, the lip extending inwardly from an end of the inner-cabin side wall of the installation base member toward an interior of the automobile.

4. The sealing structure as claimed in claim 3, wherein a front end of the drip seal extends downward, and an upper end part of a seal line is closer to a rear part of the automobile body than a front end part of a lower end line, the seal line being a part of the projection in elastic contact with the buffer, and the lower end line being a part of a drain of the drip seal in elastic contact with the sliding door.

5. The sealing structure as claimed in claim 4, wherein the upper end part of the seal line is closer to the upper part of the automobile body than the front end part of the lower end line.

6. The sealing structure as claimed in claim 3, wherein a front end of the drip seal extends downward, and the front end of the drip seal is integrally molded with the buffer.

7. The sealing structure as claimed in claim 2, wherein a front end of the drip seal extends downward, and an upper end part of a seal line is closer to a rear part of the automobile body than a front end part of a lower end line, the seal line being a part of the projection in elastic contact with the buffer, and the lower end line being a part of a drain of the drip seal in elastic contact with the sliding door.

8. The sealing structure as claimed in claim 7, wherein the upper end part of the seal line is closer to the upper part of the automobile body than the front end part of the lower end line.

9. The sealing structure as claimed in claim 2, wherein a front end of the drip seal extends downward, and the front end of the drip seal is integrally molded with the buffer.

10. The sealing structure as claimed in claim 1, wherein a front end of the drip seal extends downward, and an upper end part of a seal line is closer to a rear part of the automobile body than a front end part of a lower end line, the seal line being a part of the projection in elastic contact with the buffer, and the lower end line being a part of a drain of the drip seal in elastic contact with the sliding door.

11. The sealing structure as claimed in claim 10, wherein the upper end part of the seal line is closer to the upper part of the automobile body than the front end part of the lower end line.

12. The sealing structure as claimed in claim 1, wherein a front end of the drip seal extends downward, and the front end of the drip seal is integrally molded with the buffer.

\* \* \* \* \*